United States Patent [19]

Hendershot

[11] Patent Number: 5,072,623

[45] Date of Patent: Dec. 17, 1991

[54] DOUBLE BLADDER FLUID CONTAINMENT SYSTEM

[75] Inventor: John A. Hendershot, Shawnee, Okla.

[73] Assignee: World Enviro Systems, Inc., Shawnee, Okla.

[21] Appl. No.: 720,664

[22] Filed: Jun. 25, 1991

[51] Int. Cl.⁵ ............................................. G01M 3/32
[52] U.S. Cl. .................................. 73/49.2; 220/403; 220/425; 220/469
[58] Field of Search ................. 73/49.2; 220/403, 420, 220/425, 445, 469

[56] References Cited

U.S. PATENT DOCUMENTS

| | | | |
|---|---|---|---|
| 3,848,765 | 11/1974 | Durkop | 220/9 A |
| 4,408,628 | 10/1983 | Monk | 137/312 |
| 4,523,454 | 6/1985 | Sharp | 73/49.2 |
| 4,524,609 | 6/1985 | Sharp | 73/49.2 |
| 4,568,925 | 2/1986 | Butts | 340/605 |
| 4,607,522 | 8/1986 | Sharp | 73/49.2 |
| 4,648,523 | 3/1987 | Strock | 220/20.5 |
| 4,651,893 | 3/1987 | Mooney | 220/445 |
| 4,672,366 | 6/1987 | Butts | 340/605 |
| 4,685,327 | 8/1987 | Sharp | 73/49.2 |
| 4,696,186 | 9/1987 | Sharp | 73/49.2 |
| 4,708,015 | 11/1987 | Sharp | 73/49.2 |
| 4,796,676 | 1/1989 | Hendershot et al. | 141/83 |

FOREIGN PATENT DOCUMENTS

| | | |
|---|---|---|
| 2161564 | 6/1973 | Fed. Rep. of Germany . |
| 2225456 | 12/1973 | Fed. Rep. of Germany . |
| 2735804 | 2/1974 | Fed. Rep. of Germany . |
| 1966825 | 1/1975 | Fed. Rep. of Germany . |
| 2352544 | 4/1975 | Fed. Rep. of Germany . |

*Primary Examiner*—Hezron E. Williams
*Assistant Examiner*—Joseph W. Roskos
*Attorney, Agent, or Firm*—Laney, Dougherty, Hessin & Beavers

[57] ABSTRACT

A triple-walled fluid containment system which includes a rigid metallic outside tank, an outer flexible bladder positioned within the rigid outside tank and a plurality of suspension elements between the tank and the outer bladder for suspending the flexible outer bladder within, and adjacent, the tank. An inner flexible bladder of complementary configuration to the outer bladder is located within, and adjacent, the outer bladder. A vacuum monitoring system communicates with the interstice between the outside and the inside bladder for evacuating the space therebetween.

6 Claims, 3 Drawing Sheets

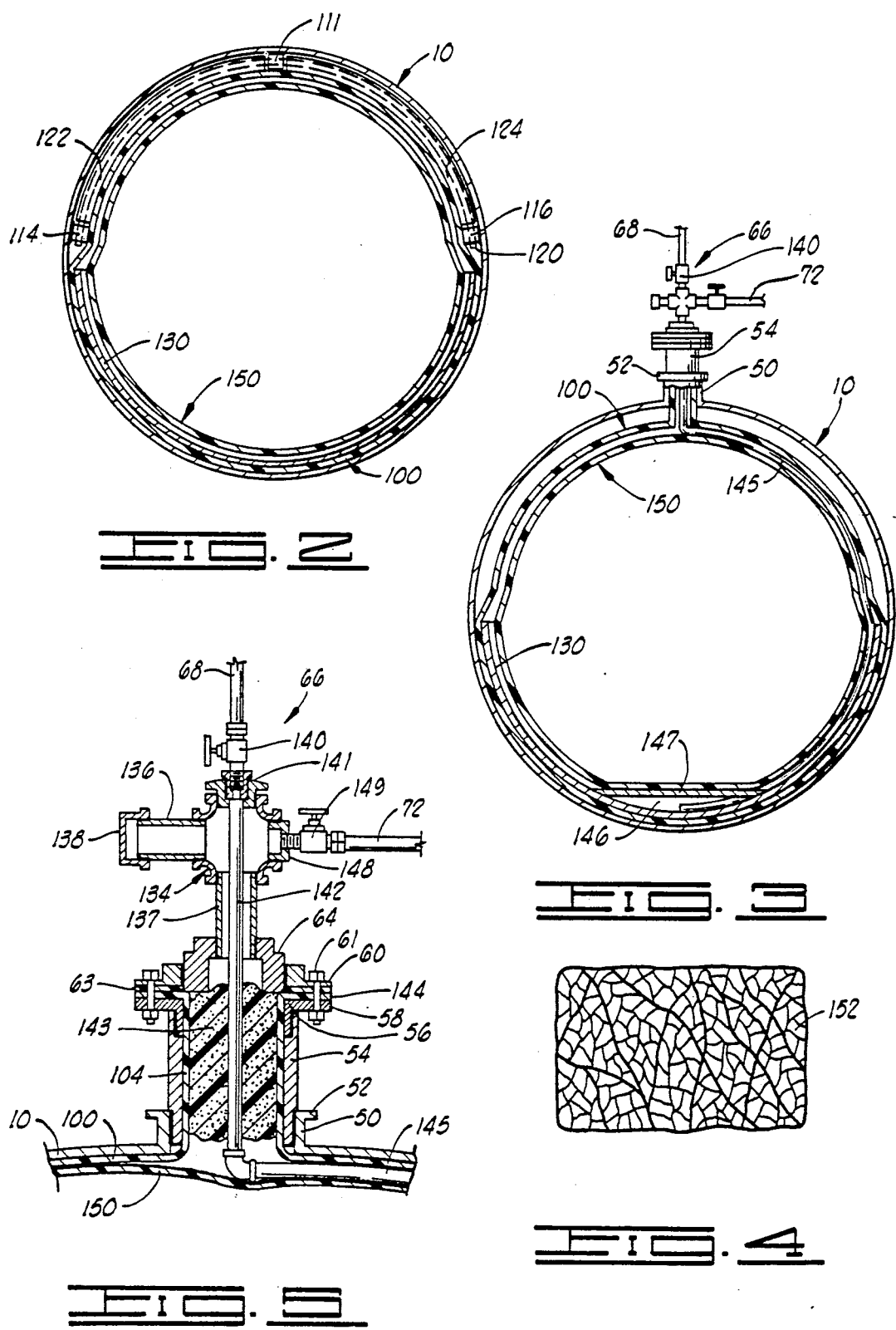

DOUBLE BLADDER FLUID CONTAINMENT SYSTEM

FIELD OF THE INVENTION

This invention relates to retrofit fluid containment systems which include a pair of contiguous, complimentarily shaped flexible bladders positioned within a rigid external tank, and used to contain fluids in a high integrity system in which the development of any leakage is continuously monitored.

BACKGROUND OF THE INVENTION

Brief Description Of The Prior Art

In U.S. Pat. No. 4,796,676, I describe a fluid containment system for more safely containing fluids so as to minimize the risk of unwanted leakage of the contained fluid to the environment of the system. Thus, for example, the risk of aquifer contamination resulting from the percolation of leaked liquids is significantly decreased, as well as the economic loss which must be ascribed to such leakage.

The patented fluid containment system described includes a conventional metallic tank of the type used to contain hundreds or thousands of gallons, of, for example, gasoline or diesel liquid, most often in an underground location. Additionally, a special flexible liner or bladder (also called an internal tank) is fitted within the external rigid metallic tank. A vacuum is developed between the flexible internal tank and the external tank. Continuous monitoring of the vacuum provides an indication of the fluid integrity of both the rigid metallic external tank, and of the flexible liner. It is not possible to be certain that the rigid external metallic tank has not developed leakage, or will not soon do so. Moreover, once the external tank commences to leak and thus affords no significant containment redundancy, the external wall thereafter merely offers mechanical support to the internal tank or liner. Until expensive repair of the metal external tank is effected, it is difficult to effectively employ an interstitial vacuum monitoring system to afford an immediate and accurate indication of leakage development in the internal liner.

Systems of the type described, which rely basically upon a rigid external tank and a single interior liner are illustrated and described in a number of U.S. patents.

U.S. Pat. No. 4,408,628 to Robert J. Monck relates to a system and method for repair of leaking storage tanks containing ground water contaminant fluid. All of the tank openings originally used by appurtenances are plugged liquid tight, except for the tank vent system. A flexible fluid tight containment means is formed within the tank in the shape of the tank interior. A sampling means is installed between the outside of the containment means and low points of the tank interior for the detection and removal of ground water leaking into the tank, and for detecting any fluid leak through the containment means. The protective area covered by the sampling means is increased by the addition of corrugated spacers between the containment means and the lower third of the tank which is the most subject to leaks. The containment means is a flexible material which is inert to the contained liquid, and sufficiently pliable and flexible to permit it to be conformed to the interior shape of the external tank.

West German Patent 1,966,825 discloses a tank leakage detection system which accomplishes leak detection by monitoring the vacuum in a space between the walls of a double-skinned fluid containment tank. The vacuum is maintained by a motor driven exhauster controlled by an automatic switch. An automatic timer switch turns on the exhauster after an adjustable time interval.

An underground gasoline storage tank hanging in an expandable bladder-like primary tank position within the interior of a rigid secondary tank is disclosed in Strock U.S. Pat. No. 4,648,523. The interior primary tank is collapsible and is a flexible-expandable bladder located within the rigid secondary tank or shell. The bladder is desirably made of a durable, flexible fluid-impervious material, such as an elastomeric or rubber-like coated material which is impermeable and chemically inert to gasoline or other materials to be stored in the tank. The rigid external or secondary tank can typically be made of low-carbon steel or other rigid material such as fiberglass, is preferably coated with a rust inhibitor and is cathodically protected to minimize external corrosion. The containment system may have yet another intermediate protective barrier wall which protects and isolates conduits placed inside the tank system, and isolates these conduits from the expanded internal bladder.

A gasoline containment storage tank system which comprises a rigid inner tank encased by a flexible outer jacket. A leak detecting means is associated with the interstitial space between the inner tank and the jacket, all as disclosed in Sharp U.S. Pat. No. 4,607,522. Another embodiment of this invention disclosed in the Sharp patent is an outer rigid tank which contains a bladder within it, together with a leak detecting system located between the tank and the bladder. The space between the inner and outer tanks is filled with impervious material. In one embodiment of the invention, a vacuum pump is used to develop a negative pressure in the closed space between the inner bladder and the outer tank.

A slightly older patent to Sharp is U.S. Pat. No. 4,524,609. This patent discloses a gasoline storage tank system which comprises a rigid outer tank fitted with an internal bladder and with an analyzer. In one embodiment of the invention, the bladder itself has a flexible, double-wall. In this embodiment, the double-wall bladder located inside the rigid outer tank includes an inner bladder and an outer bladder. Optionally, some means is positioned between the two bladders to maintain a spaced relationship. The space between the two bladders is monitored for leakage of gasoline through the inner bladder. The patentee states that the advantage of the double bladder embodiment of the invention is that it provides another measure of protection against gasoline leakage, and can be considered a fail-safe design. The system is said to be quite useful where the rigid outer tank has earlier suffered structural damage. Monitoring of the system for leakage is said to be continuous.

Bruce R. Sharp U.S. Pat. No. 4,523,454 discloses a storage tank system for storing gasoline and comprising a rigid inner tank encased within a flexible outer jacket, with a leak detecting means associated with the closed space between the inner tank and the flexible outer jacket.

In Sharp U.S. Pat. No. 4,685,327, the storage tank system disclosed includes a rigid inner tank for containing gasoline. This tank has a sealed manhead with a dispensing line extending up through the manhead. A sleeve encompasses the manhead and a jacket encases the tank and at least a part of the sleeve. A detector is associated with the closed space between the inner tank and the jacket to detect leaks from the inner tank into the interstitial space between the inner tank and the surrounding jacket. The jacket is made of a flexible material, such as a synthetic polymer, or the jacket may be made of a rigid material such as steel or fiberglass.

In West German Patent 2,161,564, a leakage indicator system for a double-walled heating oil tank is disclosed. The system produces a vacuum in the interstitial space between the two walls of the storage tank system. The indicator system also contains a pressure-dependent switch arrangement to control the vacuum pump, and an alarm unit to monitor several containers.

West German Patent 2,352,544 discloses a double-walled container with a pump used to pressurize the space between the two walls. A switch is positioned to be activated by the pressure in the pressurized interstitial space, and the switch is connected to an alarm system.

In West German Patent 2,225,456, a leak indicator and testing device for gasoline tanks of the double-walled type is disclosed. The solid outer container and flexible inner container define an evacuated cavity between them, and the suction line from the vacuum pump used to develop the vacuum in the cavity issues into that cavity and goes to the bottom or sump thereof at the lowest level between the solid outer container and the flexible inner sleeve. The suction line from the vacuum pump runs down to the bottom of the cavity or sump through a slot formed down to this level within the inside wall of the solid outer tank.

A double-walled tank is provided for the storage of fuel oil or other liquids in Durkop U.S. Pat. No. 3,848,765. This system includes spaced inner and outer tanks. The inner tank can be made to be easily removable from, and insertable into, the outer tank. A pump is connected to a tube which extends into the space between the tanks to evacuate this space, and this vacuum is continuously monitored in order to detect leakage.

In Butts U.S. Pat. No. 4,568,925, an improved leak detection system for detecting leakage from underground storage containers and pipelines is disclosed. A leakage sensor is positioned adjacent the fuel storage container, and an impervious enclosure is used to extend around and enclose both the sensor and the container.

Another double-walled containment system patent is issued to Bruce R. Sharp, and is denominated U.S. Pat. No. 4,708,015. This system, like that disclosed in some of Sharp's other patents, includes a rigid inner tank which is encased by a flexible, yet chemically resistant outer jacket. This forms the closed space between the two elements. The system is monitored for leakage in a reliable and economic fashion. The space between the vessels is at least partially filled with a leak detecting liquid and a non-visual leak detection means is associated with this space for detecting any change in the level of that detecting liquid.

In yet another Sharp patent, U.S. Pat. No. 4,696,186, a fluid containment system particularly well suited for gasoline is disclosed. This system includes an outer rigid tank with an internal bladder. A leak detecting means is positioned between the external tank and the internal bladder. The bladder has openings into it which are sealed with the outer shell at a certain location, and gas impervious material is positioned between the bladder and the wall of the outer tank, and is securely adhered to each of these vessels.

In Mooney U.S. Pat. No. 4,651,893, an underground liquid storage tank assembly is disclosed, and this assembly includes an inner vessel which is preferably constructed of steel or other strong, relatively rigid material, and a seamless outer containment shell which is a corrosion resistant material, such as fiberglass. An intermediate spacer member is provided between the inner vessel and the outer containment shell to hold the two members rigidly together in spaced relation to each other, and to allow for free passage inside the outer containment shell of any liquid which might leak from the inner vessel. A structure is provided inside the outer containment shell to enable leaking liquid from the inner vessel to be detected.

Butts U.S. Pat. No. 4,672,366 discloses a system for containing petroleum products in a subterranean location which includes a steel or other rigid metallic tank positioned within an impervious enclosure surrounding the tank. A leak-sensing means is positioned at one end of the tank, but inside the impervious enclosure so that the leak sensor is actuated upon the occurrence of leakage from the tank. One type of material which can be used to make the liquid impervious enclosure is high density polyethylene.

West German Patent 2,735,804, issued in 1979, discloses a leakage detection and measuring system in a double-walled storage vessel. The internal storage vessel is for the primary containment of the liquid. A secondary or external storage vessel surrounds the internal storage vessel and a space is defined between the two. Pressure in this space is monitored for liquid penetration, and in doing so, the pressure is kept below atmospheric by a vacuum pump operated with a pressure and/or time dependent control. Separate evacuation and pressure measuring pipes are provided. When the pressure in the test space rises owing to unavoidable harmless leakages, the pressure is automatically maintained within a certain pressure range according to a predetermined program. Delay or failure to reach the pressure range lower threshold is taken as indicative of a leak. Means is provided which signals a pressure rise in the evacuation pipe above the lower pressure threshold.

BRIEF DESCRIPTION OF THE PRESENT INVENTION

The use of a double internal liner or bladder system enables old, leaking metallic or fiberglass underground storage tanks to be restored to reliable and useful fluid containment service. So long as the old metal or fiberglass rigid tank has sufficient integrity to continue to define a generally smooth walled cavity, it can be used to confine a pair of juxtaposed internal flexible liners which themselves afford excellent fluid containment capability. The utilization of a vacuum monitoring system of the type described in my co-pending U.S. patent application Ser. No. 07/568,764 for monitoring a vacuum maintained between the two flexible internal bladders, or liners, will, moreover, afford a reliable method of continuously assuring the high integrity and leak-free character of the bladders.

Broadly described, the fluid containment system of the present invention includes a rigid outer tank constructed of a ferrous metal, such as steel, or a synthetic resin, such as fiberglass, within which are disposed a pair of flexible liners or bladders. Each of the bladders has a configuration which is substantially complementary to the configuration of the rigid external tank. In use, a fluid product is contained within the innermost bladder, and the old rigid tank functions primarily to afford definition and structural support.

The outer of the two internal bladders is suspended from the rigid external tank. Although this may be accomplished in several ways, a preferred embodiment of the invention entails the use of a plurality of rigid support rings secured to the interior surface of the rigid external tank at selected locations. A series of arcuate tubes or rods which are relatively stiff, and yet can be resiliently deformed, with manual exertion, to place them in the proper position within the external tank, are then used to suspend the outer flexible bladder from the rings within the outer rigid tank in an expanded configuration generally similar to the shape of the outer tank. This is accomplished by providing a plurality of hems or sleeves of material affixed to the outer surface of the outer flexible bladder. These rings or sleeves, which may be generically termed "hems", are positioned so that the elongated rods or tubes can be extended through the rings or sleeves carried on the outer surface of the outer flexible liner or bladder, and can also be concurrently extended through the rigid support rings secured at selected locations to the inner surface of the rigid outer tank. The suspension of the first or outer bladder within the rigid outer tank is thus facilitated.

The primary reason for mechanically fastening or suspending the outer flexible bladder to the inner surface of the rigid outer tank is to keep the bladder as open as possible so that when the tank periodically returns to an empty condition, the top and sides will not fold over or collapse upon themselves, thereby creating a pleat or fold which could bind and severely pull or stress the flexible bladder when the tank is re-filled. In other words, the bladder, being flexible and relatively thin, will tend to sag or semi-collapse as fluid is loaded into the containment system and removed therefrom. The fastening devices, including the rings, ribs and hems should therefore be placed in such a manner as to keep this outside or first bladder expanded and sufficiently open to permit repeated filling and emptying of the dual bladders without their sagging so much as to fold over upon themselves.

It is assumed that an existing rigid tank in which the double bladder installation is to be made is provided with a radially extending manhole, thus facilitating access to the interior of the tank. Such construction is conventional in such liquid storage tanks as gasoline and diesel containment tanks used for underground storage of these liquids. Such radially extending manhole or manway facilitates access to the interior of the tank. If a manway of the described type is not located on the tank which is to be retrofitted with the two internal flexible bladders, then such a radially extending manway will be provided, and will be made to carry a circumferential, radially extending flange at its radially outer end. The first or outer flexible bladder placed within the rigid external tank will be constructed with a matching radially extending manway liner which extends radially outwardly and lines the radially extending manway of the external tank.

Before installation of the first outer bladder is commenced, the interior of the rigid tank is cleaned and dried. Any sharp protuberances which extend inwardly from the tank are blunted, or preferably removed. Any holes or perceptible leaks in the rigid tank are preferably patched or sealed, although this is not necessary to the installation, and its adequate, though less than optimum performance.

After the first or outer bladder is put into the tank through the manhole, it is suspended from the fixed rings on the inner surface of the external tank in the manner earlier described. The outer bladder will carry a protuberant manway neck, as described, which is sized to line the manway of the rigid external tank. The manway neck on the bladder will carry a circumferential, radially extending sealing flange which can be sealed against the corresponding manway flange on the external tank.

Similarly, the outer flexible bladder carries a second, radially protruding vacuum monitoring system neck which is sized to project into and line an adapter nipple which is screwed into, and projects radially outwardly from, one of the several three or four inch fittings usually provided through the tank wall at locations spaced along the tank from the manway. An annular flange is carried on the outer end of the adapter nipple, and mates with a circumferential or annular flange carried on the vacuum monitoring system neck. The flange on the flexible bladder sealingly engages the flange carried on the adapter nipple. The described sealing of the flanges to the manway flange and to the adapter nipple annular flange are effected after the installer of the outer bladder has exited through the manway following installation of the suspension ribs through the fixed suspension rings to suspend the bladder within the rigid outer tank as described.

Before cutting out the centers of the flexible manhole protuberance, and of the vacuum monitoring system neck, the outer bladder can be expanded by air pressure. The hose of a shop vacuum, or similar vacuum equipment, may be communicated with, and used to evacuate the space between the outer bladder and the rigid tank by means of another pipe fitting usually provided on the tank. This, of course, assumes that the tank has either had no leaks therein, or that such leaks have been patched at least sufficiently to allow a vacuum to be pulled and sustained for a short time between the rigid outer tank and the first or outer flexible bladder in order to draw the bladder into position. Thus, although the first outer flexible bladder is mechanically suspended within the rigid external tank, the development of a vacuum between this outer bladder and the tank provides more flattening and smoothing of the surface of the bladder. This assists in the later spreading and shaping of the second or internal bladder, and specifically its embossed outer surface which is moved to, and against, the outer flexible bladder, as will be hereinafter explained.

The next step which is preferably taken in the installation of the fluid containment system of the invention is that of placement of non-woven geotextile-type fabric within the external flexible bladder and in contact with the ends of the bladder, and over at least the lower half of the cylindrical extent thereof. The non-woven geotextile-type fabric is a smooth surfaced fabric which is commercially available. The fabric is taped to the inner surface of the first or outer bladder, or is in some other suitable manner secured thereto, so that it is retained in position over the described portion of the internal surface of the outer bladder. The outer bladder is thus prevented from shifting when the internal second bladder is installed, and is worked into place as hereinafter described. The geotextile fabric is characterized in having surfaces with a relatively low coefficient of friction, and is porous. These properties permit the embossed outer side of the second or internal bladder, hereinafter described, to slide or move more freely within the outer bladder, thereby materially reducing any propensity or tendency of the internal bladder to crease or become folded when vacuum is later applied between the two flexible bladders.

After the first bladder has been installed inside the rigid external metallic or fiberglass tank, and has been caused to conform to the inner wall of this tank as closely as possible, the mating manway flanges have been installed in flatly abutting relation and have been securely bolted and sealed against each other. The flange on the adapter nipple has also been sealed against the flange on the vacuum monitoring system neck, and the geotextile liner fabric has been positioned. At this time, the second or internal flexible bladder is inserted through the manhole, and into the interior of the external flexible bladder. The second bladder is laid out across the bottom of the tank inside the first bladder.

Prior to the time that the internal flexible bladder is placed inside the external bladder, a small rigid plate of steel or plastic is laid transversely across the external bladder over the geotextile fabric liner at the center of the bottom of the tank (on the inside of the external bladder) so that this steel or plastic plate lies between the internal bladder and the external bladder as the internal second bladder is positioned. As will later be described, a sump hose or line runs from a vacuum interstice adapter down between the external bladder and the internal bladder to the sump. The rigid plate of steel or plastic defines the sump space into which the hose end extends, and the plate protects the end of the sump hose from being compressed to a closed status by the weight of the liquid contained within the system.

After the second bladder is laid out across the bottom of the tank inside the outer bladder, air under pressure is introduced through the sleeve in the manhole fitting to expand and fill the inner flexible bladder with air. The installer exercises care to be certain that the inner bladder opens up as near as possible to, and forms flatly against, the outer bladder. After the internal second bladder is filled with air, positive internal pressure is kept on the bladder during an ensuing evacuation step in which the interstitial space between the internal bladder and the external bladder is evacuated.

The second bladder, like the outer first bladder, carries a radially projecting manhole protuberance having an annular flexible manhole flange secured therearound. The steel ring initially bolted to the manhole flange to hold and seal the first exterior bladder is now unbolted and the flange of the second or internal bladder is put in place. When the manhole flange on the internal bladder is flatly abutted against the rigid flange of the external tank and the flange of the outer bladder, the steel ring is replaced and re-bolted in place, thereby holding and sealing both bladders to the rigid tank manifold flange. At this time, the center of the flexible manhole protuberance carried by the second, internal bladder can be cut away to open the interior of the internal bladder to the placement of the fluid therein at a subsequent time.

GENERAL DESCRIPTION OF THE DRAWINGS

FIG. 2 is a sectional view taken along line 2—2 of FIG. 1.

FIG. 3 is a sectional view taken along line 3—3 of FIG. 1.

FIG. 4 is a detail view showing the crossed reticulations and random protuberant ribs located on the embossed outer surface of the internal flexible bladder forming a part of the present invention.

FIG. 5 is an enlarged cross-sectional view in a vertical plane taken through the center of an interstitial vacuum adapter subassembly secured to the rigid outer tank, and illustrating the details of construction of such interstitial vacuum adapter subassembly forming a part of the invention.

DETAILED DESCRIPTION OF A PREFERRED EMBODIMENT OF THE INVENTION

Figure 1:
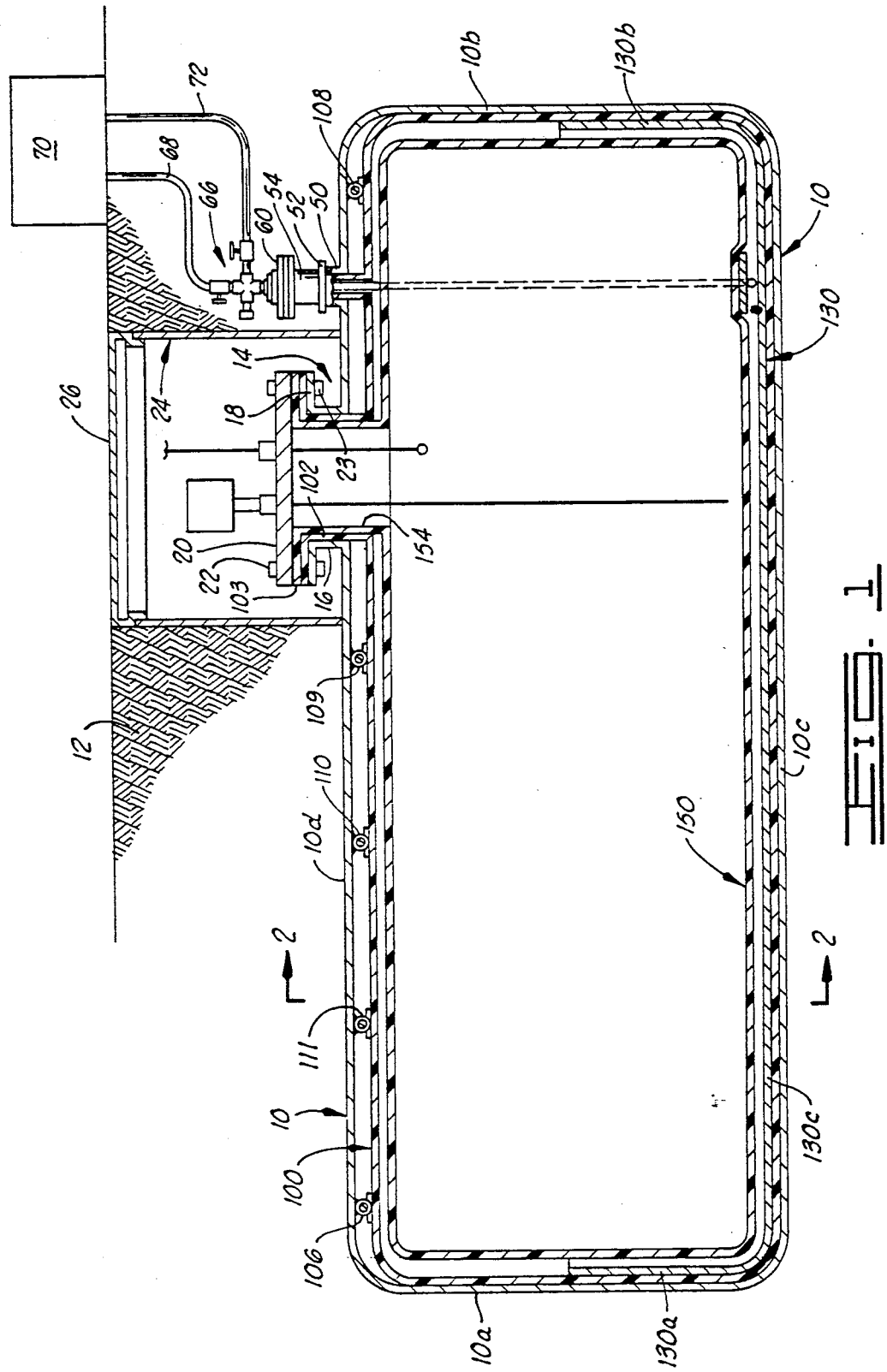
FIG. 1 is a longitudinal vertical sectional view taken along the centerline of a large fluid containment system constructed in accordance with the present invention, and located in a subterranean or underground location.

Referring initially to FIG. 1 of the drawings, the fluid containment system of the invention includes a rigid external tank 10 which may be constructed of various metals and metal alloys, such as steel, or of a rigid synthetic resin material (such as fiberglass). The external tank 10 includes a pair of opposed ends 10a and 10b, a bottom 10c and a top or upper portion, denominated generally by reference 10d. The rigid external tank or container 10, in the illustrated embodiment, is of generally cylindrical configuration and has a pair of opposed, planar ends. The tank may, in some types of construction, however, have a pair of arcuate or frustoconical end portions In the illustrated context of the tank 10, it is shown buried in a subterranean location and is covered with earth 12.

The tank 10 is provided with a radially outwardly protuberant manway, designated generally by reference numeral 14, located at its upper side. The manway 14 is typically constructed of steel or fiberglass, and is joined to the tank 10 in any suitable way. The manway 14 includes a radially protuberant, generally cylindrical neck 16 which has a circumferentially extending, annular sealing flange 18 around its radially outer end. As will be subsequently explained, the annular sealing flange 18 acts as a securement and sealing locus functioning to permit a pair of complementary flexible bladders located inside the rigid tank 10 to be sealed in operative position by securement of a pair of flexible flanges carried on these bladders to the rigid annular sealing flange. When the system is in use, a rigid manway cover plate 20 extends over, and is bolted by bolts 22 in a position of closure across, the manway annular sealing flange 18. Access to the interior of the rigid external tank 10 is, of course, available through the manway 14 when the closure plate 20 is removed to open the manway. A large cylindrical access passageway housing 24 extends upwardly from the outer side of the tank 10 toward the surface of the ground 12, and is closed at its upper end by a removable ground plate 26. In the case of rigid tanks which do not have any manhole or manway formed therethrough as a part of the original equipment, one is installed at the outset of the retrofitting of the tank with the double internal flexible bladders of the present invention.

In the usual underground gasoline or diesel oil storage tank construction, the tank will have one or more upwardly extending fittings in addition to the manway. One such fitting is illustrated in FIG. 1, and is an upwardly extending, internally threaded fitting 50, and may typically have an internal diameter of approximately four inches. The fitting 50, like the manway 14, carries an annular flange 52 at its radially outer (upper) end. An externally threaded extension nipple 54 is screwed into the fitting 50, and projects radially outwardly therefrom as illustrated in FIG. 1. As shown in FIG. 5, a threaded neck 56 on a steel annular sealing flange 58 (forming one-half of a double flange) is screwed onto the nipple 54. The sealing flange 58 provides a sealing locus for a flexible annular flange provided on a radially protuberant neck carried on the outer, flexible bladder located in the rigid external tank, all as hereinafter described in greater detail.

An internally threaded top flange 60 (forming the other half of the double flange) is bolted in place in a position overlying the annular flange 58 using bolts 61. The rigid sealing flanges preferably engage a neoprene sealing gasket 63 which extends therebetween. A vacuum adapter assembly 66 is connected by a threaded nipple to the top flange 60. The details of construction of this vacuum adapter assembly 66 will be hereinafter described in greater detail. From the vacuum adapter assembly 66, high vacuum line 68 extends upwardly to the vacuum control and test panel 70 (see FIG. 1). A main vacuum or air line 72 also extends from the vacuum adapter assembly 66 upwardly to the vacuum control and test panel 70.

In the construction of the triple-walled fluid containment system of the invention, a pair of flexible bladders or liners, each of an expanded shape which is complementary to the other, and to the rigid external tank 10, are placed within the rigid external tank. These flexible bladders are illustrated in FIGS. 1, 2 and 5 where they are designated generally by reference numerals 100 and 150, respectively (outer and inner).

The first of these flexible bladders, which will be termed the outer bladder 100, is placed within the external tank 10 through the open manway 14. After it has been placed within the external tank 10, it is desirable to open or distend the outer bladder 100 to a configuration in which it is, as nearly as possible, complementary in shape to the rigid external tank 10. For this purpose, the outer bladder 100 is first positioned within the external tank 10 so that a protuberant manway neck carried thereon, and denominated generally by reference numeral 102, extends radially outwardly into the manway opening in the external tank.

The outer bladder 100 is then hung or suspended from the upper portion of the rigid external tank 10. The principal reason for hanging or suspending the outer bladder 100 from the upper internal wall of the rigid external tank 10 by some type of mechanical, adhesive or magnetic fastening means is to keep the outer bladder 100 as open and distended as possible. As the tank status cycles between an empty and a full condition, the top and sides of the outer bladder will not be permitted to lay over upon themselves, thereby creating a fold or crease which can bind and severely pull the flexible membrane or material of which the outer bladder 100 is constructed at a time when the tank is refilled. The flexible membrane of which the outer bladder is constructed will tend to collapse under the influence of gravity, and the hanging or suspension devices should be placed at locations within the rigid external tank which are sufficient to keep the bladder expanded and sufficiently open at all times, so that repeated filling and emptying of the two superimposed complementary-shaped bladders will occur without them sagging so much that they become folded or creased over extended periods of usage.

For the purpose of suspending the outer bladder in a preferred embodiment of the invention, a plurality of rigid rings constructed of steel, or other strong rigid material, are secured to the inner surface of the rigid external tank 10 at selected locations. Such rings can be constructed by cutting a series of them from a one and one-half inch diameter steel pipe, with the width of each ring being about one and one-fourth inch. As illustrated in FIGS. 1 and 2, a series of these suspension rings are located in a line along the top center line of the tank 10. Thus, one of the suspension rings 106 is located near one end of the tank and another suspension ring 108 is located at the opposite end of the tank. Three additional suspension rings 109, 110 and are then spaced from each other at approximately equal intervals between the manway 14 and the suspension ring 106 near the end of the tank.

There are then two additional suspension rings located in each of the vertical diametric planes extended through each one of the suspension rings located along the top center line of the tank. These two additional suspension rings, located in the vertical diametric plane of each of the top suspension rings, are disposed on opposite sides of the external tank very near to, or in, a horizontal plane extended diametrically through the center of the tank. Thus, as shown in FIG. 2, two of such rings, 114 and 116, located on opposite sides of the tank, but in a common vertical plane, are depicted. These rings are located in the same diametric plane as the top centerline suspension ring 111. This geometric relationship of one ring along the top center line being in coplanar alignment with two rings located at opposite sides of the tank is true of each of the suspension rings 106-111. It will be noted that in every case, the opening through the respective suspension ring is oriented to receive a semicircular suspension rib 120 for the purpose of holding the outer bladder in position in the manner hereinafter described. Stated differently, the openings through the suspension rings face laterally, rather than longitudinally within the tank.

In order to hang the outer bladder 100 from the rigid external tank 10, a series of strong, flexible loops or sleeves are affixed to the outer side of the outer bladder as short spaced hems. These hems are positioned on the external surface of the outer bladder at locations such that the hems are located on opposite sides of the centerline-disposed suspending rings 106-114. In a preferred embodiment of the invention, each hem is made by securing one side or an edge of a narrow piece of the same material as that of which the outer bladder 100 is constructed to the exterior surface of the bladder. The material is then folded into a loop or sleeve and the opposite side or edge of the narrow strap is sewed to the bladder in such manner as to form a loop or horseshoe-like sleeve. Each sleeve is of sufficient size to permit a relatively stiff, yet resiliently bendable, tube or rod constituting a retaining rib 120 to be slid through the hem. The opening or loop of each one of the hems is positioned directly in coplanar alignment with three of the coplanar suspension rings that have been welded or otherwise secured to the tank in a vertical diametric plane. The described structure is perhaps best illustrated in FIG. 6 of the drawings.

Figure 6:
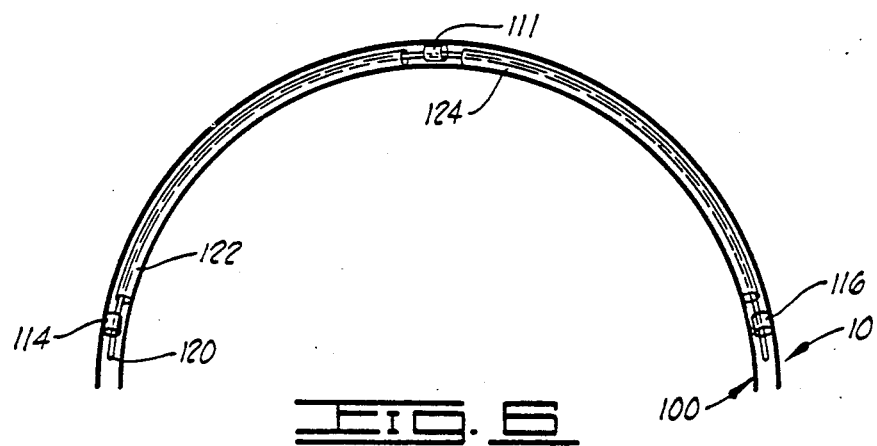
FIG. 6 is an enlarged view, partly in elevation and partially in section, of the hanger and suspension system used for suspending the outer bladder within the rigid tank.
Figure 7A:
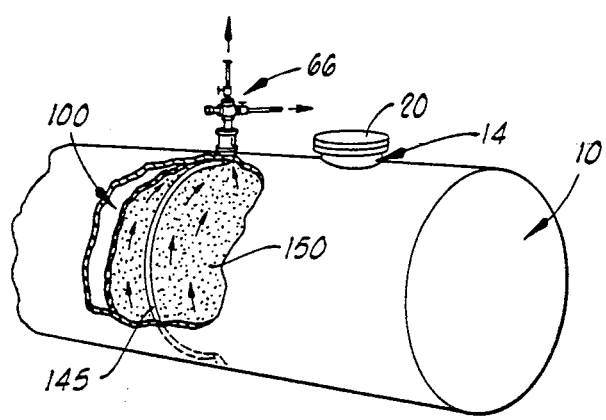
FIGS. 7A and 7B are diagrams illustrating the status of the fluid containment system during low vacuum continuous monitoring of the interstitial vacuum.
Figure 7B:
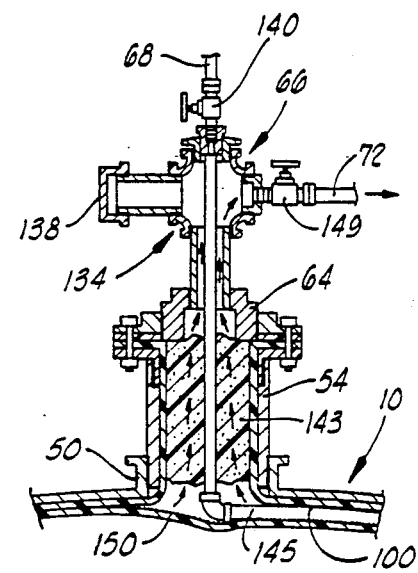
Figure 8A:
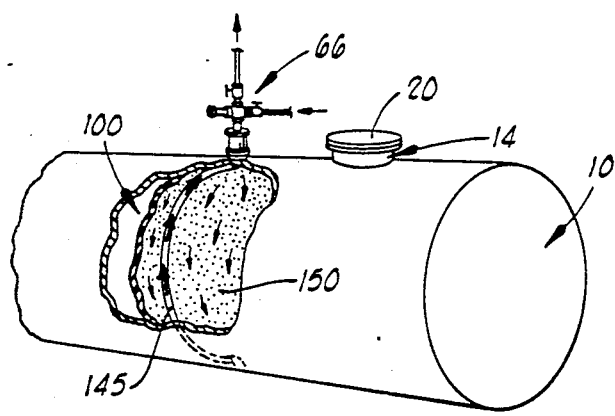
FIGS. 8A and 8B are diagrams illustrating the status of the fluid containment system during high vacuum testing of the system.
Figure 8B:
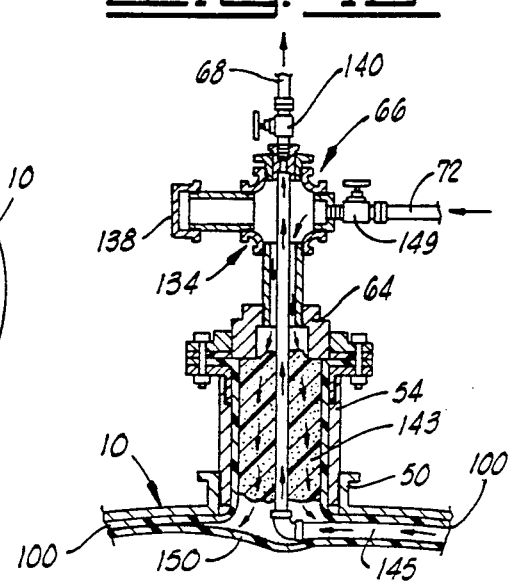

In the illustrated embodiment of the invention, two elongated hem sleeves 122 and 124 are provided in each of the vertical diametric planes in which three of the suspension rings are located. Thus, in FIG. 2, two of such circumferentially spaced, coplanar elongated hem sleeves 122 and 124 are illustrated, and this Figure serves to show the manner in which the outer bladder is hung or suspended from the upper half of the cylindrical tank. This arrangement is also shown in FIG. 6. Longer or shorter hem sleeves may be used, and the total number used in association with each set of three coplanar suspension rings may vary.

Each of the elongated arcuate retaining ribs 120 which is provided in association with the sets of coplanar aligned suspension rings and hem sleeves is a relatively stiff member which nevertheless has sufficient resiliency and flexibility that it can be manually bent as one end of the retaining rib 120 is passed through first one of the hem sleeves, then through the uppermost or top centerline suspension ring, and then through the other of the hem sleeves. The two opposed ends of the retaining rib 120 are then extended through the two coplanar-aligned rigid suspension rings located on opposite sides of the rigid external tank.

In order to accomplish this final extension through the two opposed, lateral suspension rings, it is necessary to bow the retaining rib 120 slightly. After the retaining rib 120 is released, it springs out, and thus it is resiliently loaded in a configuration which causes it to bear forcibly against the inner surface of the rigid external tank 10. This loading of each of the retaining ribs 120 in resilient deformation assures that the coplanar sleeves located between the suspension rings will follow the respective rib in a truly arcuate curvature in which the sleeves are forced against the inner side of the rigid external tank 10. The retaining ribs 120 used may be either solid or hollow, and in any event, should have the properties of stiffness and resilience which have been described.

The flexible tubing or rod constituting each retaining rib 120 may be started through one end of one of the hem sleeves and fed through the hem sleeve and then through the suspension ring at the top center of the tank. Feeding of the retaining rib through the second aligned hem is then commenced and then continues on through the second hem and down the opposite side of the tank to a point where the two ends of the retaining rib 120 are substantially equal distances from the top center ring. In a preferred embodiment of the invention, the retaining rib will then extend approximately one foot out of each hem on opposite sides of the tank. Each flexible retaining rib has a stiffness and strength such that, when it is held against the inside of the tank by the respective set of three rigid suspension rings which are in coplanar alignment and through which each retaining rib is passed, it will exert sufficient outward force to hold both of the "mated" bladders (outer and inner bladders) very close to the curved top half of the cylindrical tank.

During installation of the retaining ribs 120, the several ribs spaced axially from each other from one end of the tank to the other (in correspondence to the spacing of the several axially spaced vertical diametric planes which contain each set of three aligned suspension rings) should be located so that the installer of the retaining ribs can exit the tank through the manway 14.

In the illustrated embodiment of the invention, five of the retaining ribs are used and are spaced along the tank on the same axial spacing as the suspension rings 106–111 shown in FIG. 1. A suitable material for the construction of each of the retaining ribs 120 is one inch ID Schedule 40 tubing of high density polyethylene. Each of the retaining ribs is cut to a length which is approximately equal to one-half the circumference of the tank.

The function of the suspension rings, hem sleeves and retaining ribs as a mechanical holding and suspension device is to fasten or hold firmly, at strategically placed intervals lengthwise across the open areas over the top half of the tank, a structure which then suspends the weight of the double bladders in a way such the top one-third to one-half of the double bladder is held open, and in close proximity to the top internal wall of the tank. This configuration of the bladders is retained, even during the period of filling and draw down of a fluid product, particularly liquid, as might be experienced at a fueling terminal or service station.

Other types of bladder suspension systems can be used, although they are presently generally thought to be less preferred. Thus a system depending primarily upon magnetism, rather than mechanical securement or connection, can be used. In such systems, the steel suspension rings may be magnetized for retaining them against the inner surface of the rigid external tank. This would allow greater versatility and selectivity in placement of the holding structure within the tank. Alternatively, oppositely located magnetic tabs can be carried on the inner wall of the tank and the external surface of the bladder at certain selected locations. It is also possible to use a series of vacuum cups secured to the outer surface of the outer bladder 100 at strategic locations.

After the installer who has rigged the outer bladder 100 within the tank 10 by suspending it in the manner described has exited the tank through the manway, the outer bladder is expanded by air pressure. At this time, the manway neck 102 on the bladder is closed by a suitable integrally formed flexible plate or panel which extends transversely across the manway neck 102. The manway neck 102 also carries at its upper end, in substantially coplanar alignment with such sealing panel or plate, a circumferential or peripheral annular flexible flange 103. The annular flexible flange 103 on the manway neck 102 of the outer bladder 100 is positioned to fit flatly and sealingly against the flange 18 of the manway 14 as hereinafter described.

The flexible outer bladder 100 also carries a tubular protuberant piping riser 104 which is, of course, also flexible, and which projects radially outwardly from the outer surface of the outer bladder so as to extend into, and line, the steel nipple 54 on the tank 10. At its radially outer end, the piping riser 104 carries an annular flexible flange 144. The flange 144 is sealed against the rigid sealing flange 58 in the manner hereinafter described. With the outer bladder 100 suspended from the upper portion of the tank 10 in the manner described, the outer bladder is expanded by pressurized air introduced to the interior of the bladder through a suitable line passed through the closure plate or panel which closes the opening through the manway neck 102 to the outer bladder. This causes the protuberant manway neck 102 and the piping riser 104 to be extended outwardly into the manway 14, and into the externally threaded steel nipple 54, respectively. The flexible flange 103 on the manway neck 102 is positioned against the annular manway flange 18. In the same way, the flexible flange 144 of the piping riser 104 is fitted against the piping riser flange 58. Bolts 22 are extended through a steel sealing ring extended around the manway and sealingly bearing against the flange 18 and flexible flange 103. Another rigid steel flange is fitted against the sealing flange 58 at the top of the nipple 54, and is secured by bolts 61 as shown in FIG. 5. The central closure plate is cut out of the flexible manway neck (not shown because removed), and also the central closure plate (also not shown) of the piping riser 104 is removed after the flanges are sealed in position, so that access is then provided through the manway, when it is opened, into the interior of the outer bladder.

Prior to the time that the flexible outer bladder 100 is inserted in the rigid external tank 10 and the flanges 103 and 144 are sealed against the rigid sealing flanges 18 and 58 of that tank in the manner described, an effort is made to close or seal any leaks that may exist in the external tank, so that it will allow a vacuum to be developed in the space between the outer bladder and the external tank, for at least a short period of time. After this has been done, or if there has been no such patching or sealing of the external tank required, a vacuum line from a suitable source is extended through any excess pipe fitting provided through the external tank at a location spaced away from the manhole, and air which is in the interstices between the rigid external tank and the outer bladder can be at least partially evacuated. In this way, negative pressure is developed between the wall of the tank 10 and the exterior flexible bladder 100. Developing the vacuum at this location enhances the flattening and smoothing of the outer bladder, so that the spreading, smoothing and matching of the interior bladder, subsequently placed within the outer bladder and then expanded, is also enhanced.

After the described installation of the outer bladder 100 has been completed, and the bladder is suspended from the top of the rigid external tank 10 and expanded as described, a large semicylindrically configured sheet 130 of geotextile material (hereinafter described) is inserted through the opening in the manway 14. The geotextile sheet 130 is placed against the bottom of the outer bladder. The geotextile sheet is then opened out so that it extends across and covers approximately the lower half of the semicylindrical outer bladder. The geotextile sheet 130 so placed is illustrated in FIGS. 1, 2 and 3, and includes a pair of opposite ends 130a and 130b and a bottom portion 130c. The function of the geotextile fabric sheet 130 is to cause the inner bladder 150, after it is installed, to more smoothly and easily open out to an unfolded and completely distended position in which its external surface is positioned immediately adjacent the outer bladder 100.

When the geotextile fabric sheet 130 is in the position described, it is taped to the outer bladder with duct tape, or secured in any other suitable manner, so as to retain it in the described position at the time when the second or internal bladder is installed and worked into place. The geotextile fabric is slick and somewhat porous and this permits the roughened, embossed side (shown in FIG. 4 and hereinafter described) of the second or inner bladder to slide more freely against it, thus eliminating or materially reducing the folding and crenelating which tends to occur as the vacuum is developed in the interstitial space between the outer bladder 100 and the inner bladder 150. The geotextile fabric utilized is a non-woven, synthetic resin fabric produced by Phillips Petroleum Company under that company's registered trademark SUPAC ®.

Prior to inserting the inner bladder 150 into the interior of the outer bladder 100 through the manway opening, it is desirable to make arrangements to permit the vacuum to be periodically developed between the inner liner 150 and the outer liner 100. For this purpose, the vacuum interstice adapter assembly 66 is attached to the rigid external tank 10 and is connected so that a part of the adapter assembly communicates with the space between the two flexible bladders after the inner bladder has been installed, and another pipe or conduit 145 communicates with a sump 146 which is formed at a location between the bottom of the inner bladder 150 and the bottom of the outer bladder 100.

As previously explained, the vacuum interstices adapter assembly 66 is connected to the external rigid tank 10 through a threaded neck defining an opening as shown at 50 in FIG. 5. The vacuum adapter assembly 66, per se, includes a four-way cross fitting 134 to which certain structural elements are connected. The four-way cross fitting 134 has four openings into the fitting from the top and the bottom, and from opposite sides thereof. These openings facilitate connection of a short pipe section 136 to the opening at one side of the cross fitting 134, which pipe section is closed by a threaded cap 138. The function of the short pipe section 136 connected into the 4-way cross fitting will be hereinafter explained.

The opening at the upper side of the 4-way cross fitting 134 is connected to a high vacuum test and sump line 68 through a suitable needle valve 140 which is threaded into an externally threaded bulkhead-type fitting 141. The fitting 141 is threaded into the opening at the upper side of the 4-way cross fitting 134. The lower portion of the bulkhead-type fitting 141 is connected to a high vacuum conduit or pipe 142 which extends downwardly through a body of open-celled polyurethane foam 143 contained within the nipple 54. The lower end of the high vacuum pipe 142 is connected to a sump pipe 145 which is extended around the inner side of the rigid external tank 10 at a location just inside the outer bladder 100. It is thus positioned in the interstitial space between the outer bladder 100 and the inner bladder 150. The sump pipe 145, as illustrated in FIGS. 3 and 5, extends around the tank to a sump located in the lower portion of the tank between the outer bladder 100 and the inner bladder 150. The sump pipe 145 is preferably a high strength flexible hydrocarbon resistant plastic tubing, and it can be retained in its operating position against the inside wall of the outer bladder by taping or the like until such time as the inner bladder is positioned within the outer bladder and is expanded into juxtaposition thereto as hereinafter explained.

A reducer bushing 64 carries an internal thread at an opening thereinto, and this facilitates connection of the reducer bushing to a nipple or short section of pipe 137 by which the reducer bushing is connected to the lower side of the 4-way cross fitting 134. The reducer bushing 64 is also externally threaded into the uppermost end of the double clamping flange 60.

In order to create a sump or open space 146 between the inner bladder 150 and the outer bladder 100, a flat rigid plate, such as a steel plate 147 having a slotted side to accommodate the extension therethrough of the sump pipe 145, is positioned horizontally across the lower side of the outer bladder 100, and into contact with the geotextile sheet 130 which lines the inner side of the outer bladder along the bottom thereof. In this way, the rigid flat plate 147 defines a sump space 146 between the two bladders as shown in FIGS. 1 and 3 of the drawings. The sump space 146 is positioned at virtually the lowest spot in the tank system so as to receive any liquid which may leak between the inner bladder 150 and the outer bladder 100 during operation of the system.

The fourth opening into the 4-way cross fitting 134 accommodates an externally threaded fitting 148 which is connected to the main vacuum or air line 72 through a suitable control valve 149.

With the flat sump plate 146 in position, the geotextile fabric liner 130 secured in the described position, and the outer bladder 100 held (by the mechanical suspension system and externally applied vacuum) in a distended, tank-lining position, the inner bladder 150 is lowered through the manway opening into the interior of the outer bladder 100. After insertion through the manway opening into the outer bladder 100, the inner bladder 150 is laid out across the bottom of the outer bladder 100, and then air pressure is introduced through the manway fitting and cover so as to expand and fill the inner bladder with air. The installer(s) watches the progress of the inner bladder inflation closely to be certain that the inner bladder expands outwardly uniformly, and as nearly as possible forms flatly against the outer bladder 100. After the inner bladder 150 has been filled with air, a slight additional increase in the pressure is developed so that the bladder is fully expanded. Concurrently a relatively rapid evacuation of the interstice between the outer bladder 100 and the inner bladder 150 can be had by removing the cap 138, and applying a high vacuum to the interstitial space via the vacuum interstice adapter assembly 66.

At this time, the two-stage vacuum monitoring system described in my U.S. patent application Ser. No. 07/568,764 has been connected by conduits 68 and 72 to the vacuum interstices adapter assembly. After inflation of the inner tank 150 and imposition of high vacuum via the nipple 136, the cap 138 is replaced, and the two stage vacuum monitoring system is energized so that a vacuum is developed through the line 72 to substantially increase the vacuum in the interstice between the outer bladder 100 and the inner bladder 150. This provides the final assistance in causing the inner bladder 150 to fit snugly into place against the outer bladder, and initiates the continuous leak surveillance which is accomplished using the two-stage vacuum monitoring system.

At this point, it should be pointed out that an important aspect of the present invention is the provision of the reticulated embossing 152 on the outer surface of the inner bladder 150. Such reticulated embossing is shown in an enlarged view in FIG. 4. This allows a more all-pervasive and uniform reduced pressure to be developed through the interstice.

At the time air pressure is applied to the interior of the inner bladder 150 to force it to unfold (and, as nearly as possible, to closely match and conform to the shape of the outer bladder 100), the embossed external surface 152 of the inner bladder 150 slides smoothly and easily across the geotextile fabric which covers the ends and bottom of the tank. This low friction contact tends to retain the embossed exterior side of the inner bladder 150 distended and prevent it from folding over and blocking or locking to itself and to the outer bladder. In other words, the geotextile fabric aids in allowing, and, in fact causing, the two bladders to conform directly and closely to each other. The two-stage vacuum monitoring and testing system described in my co-pending U.S. patent application Ser. No. 07/568,764 is then set by means of the control unit 70 to operate in the normal automatic mode as described in that application.

From the foregoing description, it will be perceived that the triple-walled fluid containment system of the invention provides desirable redundancy in terms of assurance against leakage, but more importantly, provides a system which can be used to extend indefinitely the service life of a worn out external rigid fiberglass or steel tank, and provides a way by which the integrity of the system can be continuously monitored and even repaired in a simple and relatively inexpensive fashion if this should be required.

Although a preferred embodiment of the invention has been herein described in order to illustrate the principles of the invention, it will be understood that various changes can be effected in the described structure and the structural relationships within the system without departure from these basic principles. Innovations and changes of this type are therefore deemed to be circumscribed by the spirit and scope of the invention when the appended claims are given a reasonably broad range of equivalents.

What is claimed is:

1. A fluid containment system comprising:
   a rigid external tank;
   an outer flexible bladder of complementary configuration to said rigid external tank positioned within said rigid external tank and adjacent the inner surface of said external tank;
   suspension means between the external tank and outer flexible bladder for suspending the outer flexible bladder within, and adjacent, the external tank;
   an inner flexible bladder of complementary configuration to the outer bladder located within, and adjacent, the outer bladder; and
   a vacuum-developing subassembly located outside said tank, and communicating through said tank with the interstitial space between the outer bladder and the inner bladder for maintaining a subatmospheric pressure in said interstitial space.

2. A fluid containment system as defined in claim 1 and further characterized as including a sheet of a nonwoven, continuous filament synthetic fiber fabric positioned between said inner and outer flexible bladders in contact with a major portion of the lower half of said inner flexible bladder.

3. A fluid containment system as defined in claim 1 wherein said suspension means comprises:
   a plurality of spaced, rigid rings connected to the upper portion of said rigid outer tank;
   a plurality of spaced hems in the form of sleeves secured to the outer surface of said outer bladder; and
   a plurality of spaced, flexible, resilient arcuate ribs each extending through at least two of said hems and through at least one of said rigid rings and each loaded in resilient deformation to bear against the inner surface of substantially the upper half of said rigid external tank over a major portion of the length of the respective rib.

4. A fluid containment system as defined in claim 1 and further characterized as including a two-stage vacuum testing system connected to said outer tank and including said vacuum-developing subassembly, and further comprising:

means for selectively and periodically developing a relatively high vacuum; and a conduit extending from said high vacuum developing means to a fluid collection locus between said outer bladder and said inner bladder;

means for developing a relatively low vacuum in the interstitial space between said inner and outer bladder; and monitoring means for monitoring the magnitude of the relatively low vacuum in said interstitial space at all times;

means for energizing said vacuum-developing subassembly periodically as needed to periodically evacuate said interstitial space at the point in time when the subatmospheric pressure in said interstitial space rises to a certain first predetermined level, and by said periodic evacuation to reduce the subatmospheric pressure in said interstitial space to a second predetermined level; and means for indicating the frequency at which said vacuum-developing subassembly is energized.

5. A fluid containment system as defined in claim 4 and further characterized as including a liquid collection sump located between a lower part of said outer tank and a lower part of said inner tank, and constituting said fluid collection locus.

6. A fluid containment system as defined in claim 1 wherein said inner bladder carries a grid of embossed, randomly oriented, reticulated ribs covering the outer surface of said inner bladder with said ribs in contact with at least a major portion of the inner surface of said outer bladder and forming interconnected air evacuation passageways.

* * * * *

UNITED STATES PATENT AND TRADEMARK OFFICE
CERTIFICATE OF CORRECTION

PATENT NO. : 5,072,623
DATED : December 17, 1991
INVENTOR(S) : John A. Hendershot It is certified that error appears in the above-identified patent and that said Letters Patent is hereby corrected as shown below:

In Column 10, line 24, after "and" insert -111-.

Signed and Sealed this

Sixth Day of April, 1993

Attest:

STEPHEN G. KUNIN

Attesting Officer

Acting Commissioner of Patents and Trademarks